(12) United States Patent
Bhargava et al.

(10) Patent No.: US 12,452,158 B2
(45) Date of Patent: Oct. 21, 2025

(54) STITCHING A SEGMENT ROUTING (SR) POLICY TO A LOCAL SR POLICY FOR ROUTING THROUGH A DOWNSTREAM SR DOMAIN

(71) Applicant: Ciena Corporation, Hanover, MD (US)

(72) Inventors: Divya Bhargava, San Jose, CA (US); Muthurajah Sivabalan, Ottawa (CA); Arif Aboobacker, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 163 days.

(21) Appl. No.: 17/675,271

(22) Filed: Feb. 18, 2022

(65) Prior Publication Data

US 2023/0269167 A1  Aug. 24, 2023

(51) Int. Cl.
*H04L 45/02*  (2022.01)
*H04L 45/12*  (2022.01)

(52) U.S. Cl.
CPC .............. *H04L 45/04* (2013.01); *H04L 45/02* (2013.01); *H04L 45/123* (2013.01)

(58) Field of Classification Search
CPC ....... H04L 45/04; H04L 45/02; H04L 45/123; H04L 45/34
See application file for complete search history.

(56) References Cited

U.S. PATENT DOCUMENTS

| | | | |
|---|---|---|---|
| 7,031,262 B2 | 4/2006 | Vasseur et al. | |
| 7,599,349 B2 | 10/2009 | Vasseur et al. | |
| 7,626,925 B1 | 12/2009 | Sivabalan et al. | |
| 7,646,772 B2 | 1/2010 | Sivabalan et al. | |
| 7,684,351 B2 | 3/2010 | Vasseur et al. | |
| 7,801,048 B1 | 9/2010 | Sivabalan et al. | |
| 8,004,964 B2 | 8/2011 | Boutros et al. | |
| 8,131,873 B2 | 3/2012 | Vasseur et al. | |
| 8,572,225 B2 | 10/2013 | Scudder et al. | |
| 8,724,454 B2 | 5/2014 | Boutros et al. | |

(Continued)

FOREIGN PATENT DOCUMENTS

| | | |
|---|---|---|
| EP | 1695313 B1 | 5/2012 |
| EP | 1844563 B1 | 1/2014 |

(Continued)

OTHER PUBLICATIONS

C. Bookham et al., "An Architecture for Network Function Interconnect," Workgroup: RTG Working Group, Internet-Draft: draft-bookham-rtgwg-nfix-arch-04, Intended Status: Informational, Jan. 5, 2022, 42 pages.

(Continued)

*Primary Examiner* — Abdulkader M Alriyashi
(74) *Attorney, Agent, or Firm* — Baratta Law PLLC; Lawrence A. Baratta, Jr.

(57) ABSTRACT

Systems and methods for enhancing Segment Routing (SR) protocols are provided for enabling the stitching of a remote SR policy to a local SR policy. A method can include obtaining a Segment Routing (SR) policy for routing a packet along a path in a downstream domain, the SR policy including at least a destination field and a color field, the destination field defining an end-point of the path in the downstream domain, the end-point representing a destination node or service instance, the color field defining the path in the downstream domain, and storing the SR policy in the database.

20 Claims, 5 Drawing Sheets

(56) References Cited

U.S. PATENT DOCUMENTS

| | | |
|---|---|---|
| 8,976,682 B2 | 3/2015 | Boutros et al. |
| 9,083,553 B2 | 7/2015 | Gandhi et al. |
| 9,419,885 B2 | 8/2016 | Boutros et al. |
| 9,450,858 B2 | 9/2016 | Saad et al. |
| 9,497,107 B1 | 11/2016 | Akiya et al. |
| 9,537,753 B2 | 1/2017 | Alvarez et al. |
| 9,634,929 B2 | 4/2017 | Boutros et al. |
| 9,699,087 B2 | 7/2017 | Boutros et al. |
| 9,722,916 B2 | 8/2017 | Sivabalan et al. |
| 9,979,629 B2 | 5/2018 | Sivabalan et al. |
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,182,000 B2 | 1/2019 | Saad et al. |
| 10,250,459 B2 | 4/2019 | Ali et al. |
| 10,250,494 B2 | 4/2019 | Sivabalan et al. |
| 10,454,821 B2 | 10/2019 | Filsfils et al. |
| 10,567,295 B2 | 2/2020 | Barton et al. |
| 10,868,755 B2 | 12/2020 | Filsfils et al. |
| 2014/0112124 A1 | 4/2014 | Sivabalan et al. |
| 2015/0304185 A1 | 10/2015 | Frost et al. |
| 2017/0026461 A1 | 1/2017 | Boutros et al. |
| 2017/0279710 A1* | 9/2017 | Khan ................... H04L 45/748 |
| 2019/0297017 A1 | 9/2019 | Pignataro et al. |
| 2020/0127913 A1* | 4/2020 | Filsfils ................... H04L 45/50 |
| 2020/0153856 A1 | 5/2020 | Nainar et al. |
| 2021/0092043 A1 | 3/2021 | Filsfils et al. |
| 2021/0258243 A1 | 8/2021 | Narasimhan et al. |
| 2021/0385150 A1* | 12/2021 | Shrivastava ............ H04L 45/02 |
| 2023/0044321 A1* | 2/2023 | Lu ......................... H04L 9/3242 |
| 2023/0216786 A1* | 7/2023 | Ma ......................... H04L 45/34 |
| | | 370/389 |

FOREIGN PATENT DOCUMENTS

| | | |
|---|---|---|
| EP | 3038301 A1 | 6/2016 |
| EP | 1676451 B1 | 8/2016 |
| EP | 3062464 B1 | 11/2021 |
| WO | 2021169278 A1 | 9/2021 |
| WO | 2021226451 A1 | 11/2021 |

OTHER PUBLICATIONS

C. Filsfils et al., "Segment Routing Policy Architecture," draft-ietf-spring-segment-routing-policy-17, Spring Working Group, Internet-Draft, Intended status: Standards Track, Feb. 16, 2022, 39 pages.

May 9, 2023, International Search Report and Written Opinion for International Patent Application No. PCT/US2023/013348.

* cited by examiner

STITCHING A SEGMENT ROUTING (SR) POLICY TO A LOCAL SR POLICY FOR ROUTING THROUGH A DOWNSTREAM SR DOMAIN

TECHNICAL FIELD

The present disclosure generally relates to networking systems and methods. More particularly, the present disclosure relates to Segment Routing (SR) and creating SR policies for routing packets from a node in a local SR domain to a destination in a downstream SR domain via a node at a border between the two SR domains.

BACKGROUND

Segment Routing (SR) is one of many types of routing techniques that may be used for transmitting packets from a source node to a destination node in a communications network. In SR, a packet may include an SR policy having a number of "segments" that define forwarding instructions. Thus, a list (or stack) of segments in the SR policy can be created or initiated by a head-end node (e.g., the source node) for defining at least portions of the path from the source node to the destination node. Each of the segments of the SR policy can be identified or represented by a unique Segment Identifier (SID). One type of SID is a Binding SID (BSID), which is configured to steer the packet to another associated SR policy.

Currently, the value of the BSID for a remote SR policy is not known by an initiating or head-end node at a source of an SR policy. However, some mechanisms have been defined in https://datatracker.ietf.org/doc/html/draft-saad-sr-fa-link-03 through which the remote BSID can be advertised as an adjacency SID to the head-end node, but these mechanisms typically are not sufficient for the head-end node to verify the explicit paths with BSID for SR policies. Hence, the currently-used BSID is essentially configured as a "static" label (e.g., segment-type A) in the hierarchical SR policy. This static label essentially does not acknowledge the segment resulting from the stitching actions.

For a PCE-based network environment, there may be ways for a Path Computation Engine (PCE) to get the BSID information via other protocols (e.g., Border Gateway Protocol (BGP), Border Gateway Protocol-Link-State (BGP-LS), etc.). However, it should be noted that not every network operator might want to deploy a system with a PCE and/or might not want to use BGP or BGP-LS. Thus, these users are not left with any other viable options but to use a static BSID label for hierarchical SR policies.

The conventional approach of using BSID segments as static labels in the hierarchical SR policy suffers from various drawbacks. For example, at a basic level, this approach can be error-prone. A network operator would normally need to remember the BSID label values in order to configure such tunnels. Also, there is currently no known way to validate the SR policy with BSID.

Some Operations, Administration, and Maintenance (OAM) systems may be configured with Bidirectional Forwarding Detection (BFD) to detect faults between nodes connected by a link. However, mechanisms configured to perform Label-Switched Path (LSP) BFD (LSP BFD) may be required to check the liveness of an SR policy having the BSID as one of the hops, but a per-policy BFD may have scaling implications. Also, OAM systems, Network Management Systems (NMSs), and the like might not always be available for controlling multiple sections of a network, particular since it is common that networks continue to grow.

There is also no known way to check the integrity of hierarchical SR policies using SR policy traceroute mechanisms. With the conventional systems, the head-end node that creates the SR policy that utilizes the BSID segments cannot adapt to any changes to the SR policies.

BSID may be dynamically assigned in some scenarios, which results in BSID changes. Also, in conventional SR architecture, there can be BSID per candidate-path, which implies the BSID value can change with the change in the active candidate-path. Therefore, if the BSID changes during the lifetime of an SR policy, then the hierarchical SR policy utilizing the BSID can become invalid. Also, if the SR policy at a remote node goes down, there may be no viable way for the network operator associated with the head-end node (or associated with the particular SR domain) to know the actual state of the hierarchical SR policy from one end to the other. That is, the hierarchical SR policy, according to conventional systems, is unable to know the entire end-to-end path of the hierarchical SR policy from the source node to the destination node. Therefore, there is a need in the field of network routing to enhance the SR protocols to overcome at least some of the limitations or deficiencies in conventional systems and methodologies.

BRIEF SUMMARY

The present disclosure is directed to systems and methods for performing routing techniques, such as source routing or Segment Routing (SR), to direct packets through a network. Particularly, conventional SR protocols may be modified or enhanced to overcome certain deficiencies that may occur with typical SR usage. For example, the systems and methods described in the present disclosure are configured to create a "stitched" SR policy that can be stitched (or appended) to an end of a local SR policy. The stitched SR policy can be represented by a Binding Segment Identifier (BSID), whereby the BSID may be dynamically updated as needed based on the status of SR paths through a downstream domain. As such, a node in an upstream domain, which would not normally be knowledgeable of the status of the path in a downstream domain, can be updated according to the implementations described herein so as to more effectively select or create SR policies for only active or operational paths.

An SR policy that encompasses one or more other remote SR policies may be referred to as a hierarchical SR policy. In this respect, any associated SR policies within the encompassing hierarchical SR policy may be stitched to or appended to one or more other SR policies as part of the hierarchical SR policy itself.

In various embodiments, the present disclosure includes a method having steps, a system such as a Network Element (NE) including at least one processor and memory with instructions that, when executed, cause the at least one processor to implement the steps, and a non-transitory computer-readable medium having instructions stored thereon for programming at least one processor to perform the steps. The steps include obtaining a Segment Routing (SR) policy for routing a packet along a path in a downstream domain, the SR policy including at least a destination field and a color field, the destination field defining an end-point of the path in the downstream domain, the end-point representing a destination node or service instance, the color field defining the path in the downstream domain that provides certain characteristics such as QoS, reliability, security, etc., and storing the SR policy in the database.

The SR policy further accompanies a source field identifying a border node that straddles the upstream domain and the downstream domain. The SR policy further accompanies a Binding Segment Identifier (BSID). The steps can include using the SR Policy to forward packets/traffic to the destination using the binding SID. The SR policy and the BSID can be obtained via one of the Interior Gateway Protocol (IGP) and the Border Gateway Protocol (BGP).

The BSID can include a value allocated by a Segment Routing Local Block (SRLB) associated with the downstream domain. The steps can include creating a hierarchical SR policy having the BSID appended to an end of the hierarchical SR policy, wherein the hierarchical SR policy is configured for directing the packet to the border node before the border node routes the packet along the path in the downstream domain. The steps can include selecting the hierarchical SR policy from one or more dynamic SR policies stored in the database for transmitting the packet along the path defined by the color field.

The steps can include creating the hierarchical SR policy based on a limited depth of a segment list of the hierarchical SR policy. The hierarchical SR policy can be created for transmitting the packet from the NE to a destination node in the downstream domain without assistance from a higher level controller having knowledge of the NE and destination node.

The NE can be a border node. The steps can include obtaining status information regarding the integrity or liveness of the path in the downstream domain. The status information can be related to the presence or absence of faults in the path in the downstream domain and/or changes to the topology of the downstream domain.

The steps can include updating the database with the status information, and providing the status information to one or more nodes in the upstream domain to enable each of the one or more nodes to store the status information in a respective database, and create a hierarchical SR policy based on one or more available SR policies stored in the respective database for communicating with one or more nodes in the downstream domain.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
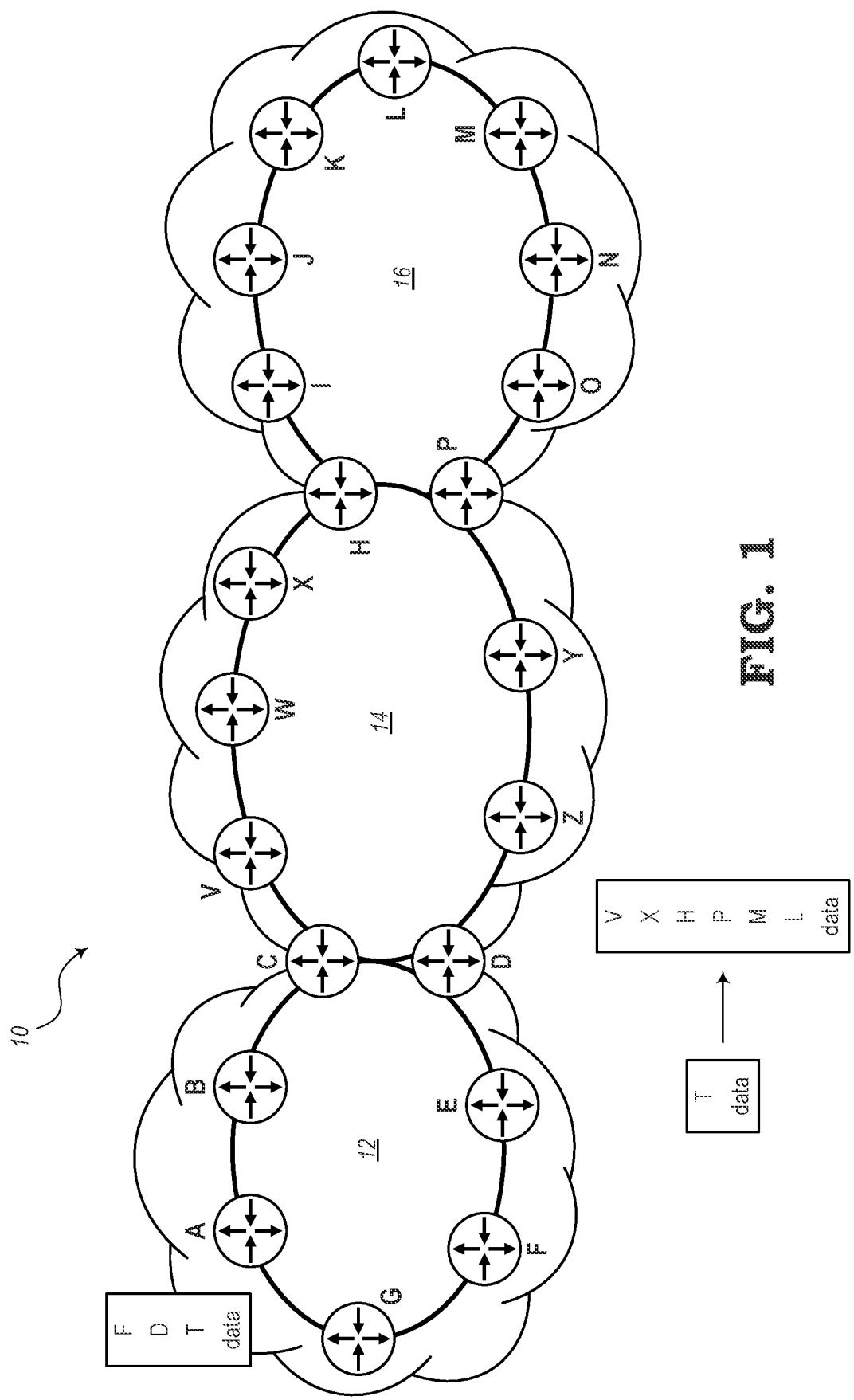
FIG. 1 is a schematic diagram illustrating a distributed system for utilizing hierarchical Segment Routing (SR) policies in a network having multiple SR domains, according to various embodiments.

The present disclosure relates to systems and methods for utilizing Segment Routing (SR) strategies for routing packets through a network. As mentioned above, an SR policy includes an ordered list of segments (or labels) that can be used one at a time for directing packets through the network in a predetermined sequence. Each segment in the SR policy is defined by a Segment Identifier (SID). A Binding SID (BSID) may be used to stitch an additional SR policy onto a local or hierarchical SR policy.

Again, BSID may be changed as a result of topology changes in the network and based on which path (e.g., "color") of an SR policy is to be used between a source node and a destination node. If the BSID changes during the lifetime of an SR policy, then the local or hierarchical SR policy utilizing the changed BSID in conventional systems can become invalid. However, according to the embodiments of the present disclosure, a changed BSID can be communicated or advertised back to the head-end node and/or other nodes within a specific SR domain.

Also, if the SR policy at a remote node goes down, the conventional systems do not provide practical mechanisms for a network operator (e.g., network manager, administrator, engineer, technician, or other user) associated with the head-end node to know the actual state of the hierarchical SR policy from one end to the other (i.e., from the source node to the destination node). However, according to the embodiments of the present disclosure, the conventional SR protocols can be modified to allow the head-end node to know when remote portions of the SR policy are down, even portions that are located in another SR domain.

The present disclosure provides embodiments for signaling the BSID and SR policy mapping in the Interior Gateway Protocol (IGP). Although BSID may already be signaled in the IGP in some cases, the embodiments of the present disclosure extend the Internet Engineering Task Force (IETF) draft proposal related to SR to specifically signal SR policy information (e.g., source, color, destination) associated with the BSID as well. As such, this would greatly simplify the usage of hierarchical SR policies.

The network operator would not need to configure the hardcoded label value for the binding segment. Similar to the way the node segments, prefix segments, and adjacency segments are defined in the SR protocols, the network operators can also define the binding segments in the explicit path. The network operators can then specify only the "color" and "destination" (or end point) of the SR policy. Based on the color and destination of the SR policy, the BSID for the SR policy can be extracted from a pre-stored record in a Segment Routing-Traffic Engineering Database (SR-TED) during computation of the SR policy at the head-end node.

This can help the network operator validate the liveness (e.g., integrity, operability, etc.) of the end-to-end hierarchical SR policy. In the case of an explicit path with segment-type A (i.e., label values), the validation of labels normally cannot be done in the conventional systems. As a result, the SR policy can still be provided by the head-end node in conventional systems even when the BSID is incorrect or when the SR policy is down. However, with the embodiments of the present disclosure, the head-end node is configured to initiate the SR policy only if the associated SR policy is valid and operational. Therefore, in a sense, the embodiments of the present disclosure provide a mapping strategy that enables the system to conduct a liveness (e.g., integrity, operability, etc.) check.

As described herein, an SR policy includes <color, destination> as well as a "source field" identifying a border node. The head end node receives the following information:
i) SR Policy <color, destination>
ii) Source (i.e., the boundary node) advertising the SR policy—this source information could be IP address or Node SID of the source
iii) The "Binding SID" associated with the SR policy.

The "color" could be the QoS, reliability, security, etc, the border node may advertise separate SR Policy for each color (even if it is to the same destination. Each such separate SR Policy will have a separate associated Binding SID (i.e. (iii) above). The advertisement may be done via IGP or BGP The end result at headend node receiving the advertisement is that it is able to determine segment list to use for a given policy (i.e., (i) above), which includes: (a) the "node SID" of the boundary node (i.e., (ii) above) & (b) the Binding SID (i.e., (iii) above.)

The approaches of the present disclosure also result in an ease with respect to maintenance. A head-end SR policy can automatically adapt to any administration and/or operational changes to the SR policy. Also, if there is any change in the BSID value on the SR policy, it can be handled without any change in configuration on the SR policy provided at the head-end node. With this approach, the network operator can also reliably check the integrity of the BSID using SR traceroute mechanisms.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Segment Routing (SR)

Segment Routing (SR) is a technology that implements a source routing paradigm. A packet header includes a stack of function identifiers, known as segments, which define an ordered list of functions to be applied to the packet. A segment can represent any instruction (e.g., topological or service-based). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. SR is described, e.g., in Fiflsfils et al., RFC 8402, "Segment Routing Architecture," Internet Engineering Task Force (IETF), July 2018, the contents of which are incorporated herein by reference. A particular attraction of SR is that it obviates the need to install and maintain any end-to-end (e2e) path state in the core network. Only the ingress node for a particular flow needs to hold the segment stack, which is applied as the header of every packet of that flow, to define its route through the network. This makes SR particularly suited to control by a Software-Defined Networking (SDN) model.

SR can be directly applied to MPLS with no change in the forwarding plane. A segment is encoded as an MPLS label. An ordered list of segments is encoded as a stack of labels. The segment to process is on the top of the stack. Upon completion of a segment, the related label is popped from the stack. SR can also be applied to the Internet Protocol (IP) (e.g., v6) architecture with a new type of routing extension header, such as, for example, according to the document published in July 2015 as draft-previdi-6man-segment-routing-header (available online at "tools.ietforg/html/draft-previdi-6man-segment-routing-header-08"). A segment is encoded as an IPv6 address. An ordered list of segments is encoded as an ordered list of IPv6 addresses in the routing extension header. The segment to process at any point along the path through the network is indicated by a pointer in the routing extension header. Upon completion of a segment, the pointer is incremented. SR can also be applied to Ethernet (e.g., IEEE 802.1 and variants thereof). There are numerous benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as SR, a source node chooses a path and encodes the chosen path in a packet header as an ordered list of segments. The rest of the network executes the encoded instructions without any further per-flow state. SR provides full control over the path without the dependency on network state or signaling to set up a path. This makes SR scalable and straight-forward to deploy. SR natively supports both IPv6 (SRv6) and MPLS (SR-MPLS) forwarding planes and can co-exist with other transport technologies (e.g., Resource Reservation Protocol (RSVP)-Traffic Engineering (RSVP-TE), Label Distribution Protocol (LDP), and the like).

In SR, a path includes segments which are instructions a node executes on an incoming packet. For example, segments can include forward the packet according to the shortest path to the destination, forward through a specific interface, or deliver the packet to a given application/service instance. Each segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types: an adjacency SID, a prefix SID, a node SID, a Binding SID (BSID), and an any-cast SID. Each SID represents an associated segment, e.g., an adjacency segment, a prefix segment, a node segment, a binding segment, and an any-cast segment.

An adjacency segment is a single-hop (i.e., a specific link). A prefix segment is a multi-hop tunnel that can use equal-cost multi-hop aware shortest path links to reach a prefix. A prefix SID can be associated with an IP prefix. The prefix SID can be manually configured from the SRGB and can be distributed by Intermediate System to Intermediate System (IS-IS), Open Shortest-Path First (OSPF), etc. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by IS-IS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR policy, the head-end node steers the packet into the associated SR policy. The BSID provides greater scalability, network opacity, and service independence. Instantiation of the SR policy may involve a list of SIDs. Any packets received with an active segment equal to BSID are steered onto the bound SR policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels). Since SR is unidirectional, transmission from a first node to a second node may take one path while transmission in the reverse direction may take another path.

The SR path (or SR policy) includes a set of segment lists that may be explicitly or statically configured. If an SR path becomes active, then traffic matching the SR policy is load-balanced across the segment lists of the path in an equal, unequal, or weighted distribution. Each path is associated with a BSID, which is a SID value that represents an SR policy (or more specifically, its selected path) to upstream routers. BSIDs provide isolation or decoupling between different source-routed domains and improve overall network scalability. Usually, all candidate paths of an SR policy are assigned the same BSID. The BSID may be associated with a static policy in the form of an MPLS label (e.g., in the range from 32 to 1048575). The BSID is a label that is available in the reserved-label-block associated with SR policies and enables an SR policy to be activated.

In some cases, an SR policy (i.e., SR path) may be identified by a tuple (e.g., head-end router, color, and end point). An SR policy may be selected from one or more candidate paths and installed in a data plane. Certain properties of the SR policy may come from the selected path (e.g., BSID, segment list, etc.). The "head-end" is the network element (e.g., node, router, switch, etc.) where the SR policy is initiated. The "color" is a numerical value that is used to differentiate an SR policy from the multiple SR policy candidates between a particular pair of network elements. The color determines the set of traffic flows steered by the SR policy. The "end-point" is the remote network element that represents the destination of the SR policy.

In order to provide greater scalability, network opacity, and service independence, SR utilizes binding segments. These segments provide a means to stitch multiple sub-path (s) or SR policies together or nest one SR policy into another. Such SR policies can also be referred to as "hierarchical SR policies."

Network with Multiple SR Domains

FIG. 1 is a schematic diagram illustrating an embodiment of a distributed system 10 for utilizing hierarchical Segment Routing (SR) policies (or local SR policies) in a network having multiple SR domains. In this embodiment, the distributed system 10 includes a plurality of nodes, labeled A-P and V-Z. The nodes, for instance, may be configured as routers, switches, or other suitable Network Elements (NEs). The nodes A-P, V-Z are arranged in one or more SR domains. The SR domains may also be referred to as Interior Gateway Protocol (IGP) areas, autonomous systems, sub-networks, local networks, intermediate systems, or other distinguishable domains, sections, or areas of a network.

As illustrated in FIG. 1, nodes A-G are arranged in a first SR domain 12, nodes C, D, H, P, and V-Z are arranged in a second SR domain 14, and nodes H-P are arranged in a third SR domain 16. Also, nodes C and D are configured as "border nodes" arranged in (or straddling) two domains (i.e., SR domains 12 and 14) and nodes H and P are also configured as border nodes and arranged in (or straddling) two domains (i.e., SR domains 14 and 16). For example, according to some embodiments, each SR domain 12, 14, 16 may be controlled by a respective controller (e.g., Network Management System (NMS), OAM controller, or the like) or may operate without a controller. As described in the embodiments of the present disclosure, the nodes themselves may be configured to create SR policies, such as hierarchical SR policies, without the help from a higher level controller.

In the illustrated embodiment, suppose that node A of the first SR domain 12 is configured as a head-end node that wishes to pass a packet to node L of the third SR domain 16. In this case, node A may be configured to create a hierarchical SR policy in the local domain (e.g., the first SR domain 12) that follows a particular path to node L. Also, suppose that node A wishes to pass the packet along a path that includes nodes F, D, V, X, H, P, M, L, in this particular sequence.

However, in some cases, a label stack in an SR policy may be limited to a certain number of segments (e.g., six). Since the intended path, which includes nodes F, D, V, X, H, P, M, L, exceed the limit of six segments, node A will not be able to utilize SR in this case. Therefore, a technique of taking an end portion of the segments and placing them in a "stitched SR policy" and then stitching or appending the SR policy a front portion of the segments can be used to meet the stack depth limit. According to the example of FIG. 1, a hierarchical SR policy may include the front portion (e.g., F, D, and a BSID "T"), where the BSID T is used to represent the remaining end portion V, X, H, P, M, L that is stitched to front portion of the SR policy.

The node D may be configured to interpret BSIDs, such as BSID "T," where T is not a segment referring to a particular node or node address, but instead is a BSID referring to another SR policy. In this case, BSID T may include a segment list (or segment stack) that includes the remaining nodes V, X, H, P, M, L in the intended path.

Therefore, the hierarchical SR policy may include two separate portions (e.g., local portion for routing within the first SR domain 12 and remote portion for routing within the second and third SR domains 14, 16). These portions can be stitched or fused together to create the intended end-to-end path. The first portion of the hierarchical SR policy (e.g., the local portion) includes segments <F, D, T> from node A (e.g., the head-end node) to node D, which is the border node between SR domains 12, 14. The remote portion of the SR policy includes segments <V, X, H, P, M, L> and considers node D to be the source node with respect to the remote portion.

Node D interprets the binding label T, which can be referred to as the "stitched SR policy" in this case. Node D, in this example, is configured to pre-store an interpretation (e.g., in a suitable SR-TED) for translating or expanding label T into the segments included in the remote or second portion of the SR policy. Before creating the hierarchical SR policy, node A will be informed about the status of the remote path from node D. The status may refer to the integrity of segments included in label T and any changes in the topology of any downstream domains (e.g., SR domains 14, 16) that may have an impact on label T and its associated nodes and paths.

Normally, in conventional systems, node A will not know what is happening beyond node D. However, in the present disclosure, node D may inform or advertise information about the remote segments of label T (and/or other BSIDs) and any changes that may have been made to the topology of the distributed system 10 and/or changes to segments in the BSID T (or label T).

Verification of paths beyond the first SR domain 12 may be performed using any suitable techniques, such as "explicit path verification," traceroute, etc. During explicit path verification of an SR policy, the SID values for node segments, prefix segments, adjacency segment, and anycast segments are derived automatically from the Segment Routing Traffic Engineering Database (SR-TED) of node D. The SR-TED may be populated via IGP updates. In this regard, multiple nodes within a SR domain (e.g., any of nodes A-G in the first SR domain 12) may receive information from another node (e.g., node D) and store this information in its own respective SR-TED. As these databases are dynamic, any changes in topology or SID information (gathered by nodes C or D acting as border nodes) from any downstream domain (e.g., the second SR domain 14) gets automatically reflected in the validity of the explicit paths. Hence, the operational state of the corresponding SR policies can be known before new SR policies are initiated.

In the conventional systems, the BSID, however, cannot be automatically derived from the SR-TED and thus has to be configured manually as a static label (segment-type A as defined in IETF's SR policy https://datatracker.ietf.org/doc/html/draft-saad-sr-fa-link-03) in the explicit path configuration. In order to configure an explicit path that includes a BSID at Node A, a user in the conventional system would configure the BSID label value T explicitly:

segment-routing traffic-engineering attributes segment-lists
    segment-list segmentListToD segments
    segment 1 segment-type-3 ipv4-address <IP address of Node F>
    segment 2 segment-type-3 ipv4-address <IP address of Node D>
    segment 3 segment-type-1 sid-value <Binding label-T>

For example, the "segment-type-1 sid-value <Binding label-T>" line may include the normal "static" segment list that would normally be manually provisioned according to the conventional systems.

Hierarchical SR policies are therefore difficult to configure and maintain in the conventional systems. Also, there are no practical ways in the conventional systems to validate such policies at the head-end node. Even when the BSID label value is configured incorrectly or the SR policy is down, the head-end SR policy remains up. Unless some per-policy OAM mechanism is used, there is no way for the user to know the actual state of the policy. Also, the conventional SR traceroute mechanisms are also not sufficient to validate the integrity of hierarchical SR policies. Therefore, to overcome these issues in the conventional systems, the embodiments of the present disclosure are configured to simplify Segment Routing-Traffic Engineering (SR-TE) deployments with hierarchical SR policies. For example, the present embodiments are configured to advertise BSID to the SR policy mapping via IGP (e.g., using Open Shortest Path First (OSPF), Intermediate System to Intermediate System (IS-IS), or the like).

According to the embodiments of the present disclosure, when BSID to SR policy mapping is advertised in IGP, this mapping can be stored in the SR-TED each local node in the local domain and used during the SR policy explicit path verification. In some embodiments, for example, SR policy information for the remote portion of the SR policy (locally initiated) may include a "source" field, a "color" field, and a "destination" field (or end-point field), which may be incorporated as new features in the SR protocols. A network operator may use the techniques described with respect to the present embodiments to route a SR policy using its <source, color, end-point> (i.e., where "end-point" may represent the destination) instead of via a BSID label value. This can be done while configuring an explicit path that includes the SR policy, as shown in the example below:

segment-routing traffic-engineering attributes segment-lists
    segment-list segmentListToD segments
    segment 1 segment-type-3 ipv4-address <IP address of Node F>
    segment 2 segment-type-3 ipv4-address <IP address of Node D>
    segment 3 segment-type-xx source <IP-addr-Node-D> color <10> end-point <IP-addr-Node-L>

It may be noted that the "segment-type-xx" may be a new segment type that may be added to an extension of the known SR protocols for defining SR policy segments.

It should be noted that there are no means in the standard related to the conventional way of provisioning SR policies to be able to "stitch" (or append) a SR policy onto the end of another SR policy, as is described in the present disclosure. The "segment-type-xx" information can be advertised (e.g., signaled, communicated, broadcast, etc.) from a border node (e.g., node D) to the other nodes (e.g., nodes A-G) in the local domain to allow these nodes to store this information in their respective databases. With the SR policy information in the database, a node can look up and find the updated information of the status of one or more SR policies related to paths and nodes in a downstream domain. If one or more paths or SR policies are available to a desired destination (node) in the downstream domain and it is found that these paths are operational (e.g., no faults), then the BSID that represents that active SR policies can be appended to (stitched to) the end of the front portion of the hierarchical SR policy.

Also, it may be noted from the example of the SR policy shown above that the "segment 1 segment-type-3" and "segment 2 segment-type-3" fields represent the local portion for reaching nodes within the local domain (e.g., the first SR domain 12). The next field that begins "segment 3 segment-type-xx" represents a dynamic remote portion of the SR policy for reaching nodes in one or more downstream domains (e.g., the second and third SR domains 14, 16). Also, this is considered to be "dynamic" because the status of paths and nodes in the downstream domain, which would previously be unknown in the conventional systems, is available to the nodes of the local domain (e.g., the first SR domain 12) as a result of the advertising by node D. Thus, the format of using "segment-type-xx," where xx may be any suitable new value that can be used in a modified version of the SR standards and protocols, is a new provisioning model and enables upstream nodes to be knowledgeable of the status of nodes in downstream domains, even when there is no higher level controller that has control over the end-to-end path. The "segment-type-xx" identifies a SR policy (or BSID) that is applicable in the downstream domain.

The concept of "BSID to SR policy mapping" refers to the dynamic representation of the remote portion of a locally-initiated SR policy based on the status of remote paths (e.g., in one or more downstream domains) and the interpretation (mapping) of a BSID in the SR policy to create and/or modify the remote portion. Since BSID to SR policy mapping is advertised via IGP, the head-end nodes (e.g., node A) can now verify explicit paths that include SR policies even if BSID is dynamically allocated and can potentially change. Thus, if there is any change in the BSID value on a SR policy, it can be handled without any change in the configuration on the hierarchical SR policy provided at the head-end node.

The BSID to SR policy mapping can also be helpful in the SR traceroute mechanisms. The conventional SR traceroute mechanisms can validate SR policies with only prefix SIDs and adjacency SIDs. Once the Binding SID (BSID) and SR policy mapping is available on the head-end node, a SR traceroute process can use the same information to check the integrity of the BSID and reliably verify the hierarchical SR policy end-to-end.

It may also be noted that, although the embodiments described in the present disclosure are specific to SR policy, the use cases of hierarchical tunnels in general are equally applicable for Resource Reservation Protocol-Traffic Engineering (RSVP-TE) or any other suitable non-SR tunnels utilizing BSIDs or the like. Therefore, the present disclosure may also be applicable for use with different types of stitched tunnels.

In the example described above, node P may also be configured to send a signal (e.g., advertise) to the nodes in the second SR domain 14 about the status of various SR policies involving nodes in the third SR domain 16. In this respect, the segments P, M, and L in the original SR policy could be represented by another SR policy. Thus, in this case, BSID T may include the segments V, X, H, P and a new BSID "U," for example, where BSID U might be configured to represent a second SR policy including segment list M and L, where node P would be configured as a border node between SR domains 14, 16 and would be configured to translate BSID U into the next SR policy.

Nodes in an SR Domain

Figure 2:
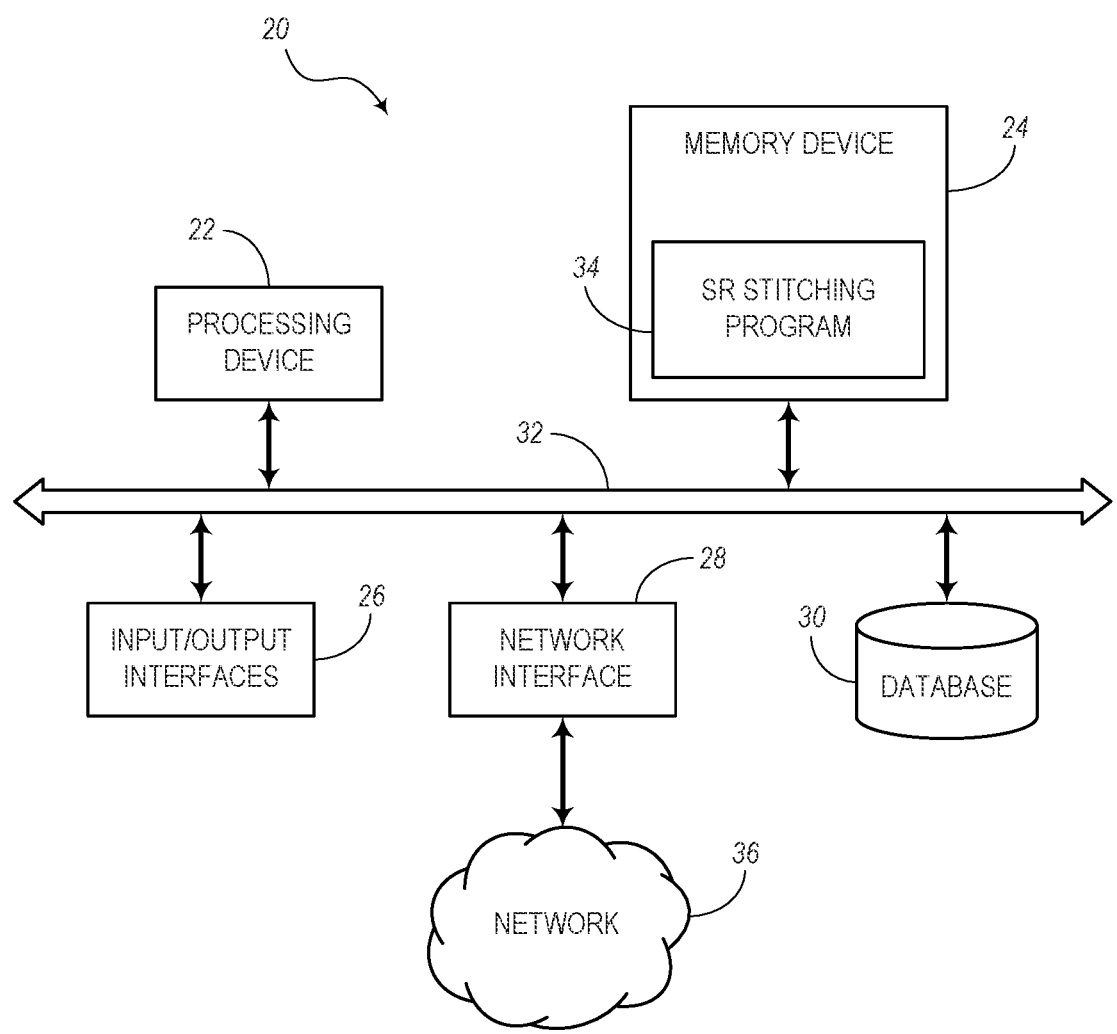
FIG. 2 is a block diagram illustrating a computing system that represents one or more of the nodes in the network shown in FIG. 1 for stitching SR policies, according to various embodiments.

FIG. 2 is a block diagram illustrating an embodiment of a computing system 20, which may represent one or more of the nodes (e.g., nodes A, D, etc.) in the distributed system 10 shown in FIG. 1 or another network (e.g., network 36). Among other purposes, the computing system 20 may be configured for obtaining, receiving, creating, or generating new SR policies (e.g., hierarchical SR policies), which may include stitching a remote portion of the SR policy to an end thereof. The status of paths affecting remote SR policies in downstream domains may be advertised by the border nodes to other nodes in the local (upstream) domain. The border nodes may advertise the BSID and SR policies within the local SR domain or within any suitable area defined by IGP.

In the illustrated embodiment, the computing system 20 may be a digital computing device that generally includes a processing device 22, a memory device 24, Input/Output (I/O) interfaces 26, a network interface 28, and a database 30 (e.g., a SR-TED). It should be appreciated that FIG. 2 depicts the computing system 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the computing system 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the computing system 20 and may include, for example, an internal hard drive connected to the local interface 32 in the computing system 20. Additionally, in another embodiment, the data store may be located external to the computing system 20 and may include, for example, an external hard drive connected to the Input/Output (I/O) interfaces 26 (e.g., SCSI or USB connection). In a further embodiment, the data store may be connected to the computing system 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the computing system 20 to communicate over a network, such as the network 36, the distributed system 10, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 36.

The computing system 20 further includes an SR stitching program 34 for obtaining or creating a new hierarchical SR policy that is configured to steer a packet from a node at a border between two domains and a destination or end-point in a downstream domain along predetermined sections of a path between the source and destination. The SR stitching program 34 may be implemented in software or firmware and stored in a suitable non-transitory computer-readable medium, such as the memory device 24. In other embodiments, the SR stitching program 34 may be implemented in hardware and incorporated in the processing device 22. In still other embodiments, the SR stitching program 34 may include any suitable combination of hardware, software, firmware, etc. and may include instructions or logic, which, when executed, enables the processing device 22 to perform certain function.

For example, the SR stitching program 34 may include a step of performing source routing, such as SR, to direct packets through the distributed system 10 or another network. The SR stitching program 34 may be configured to create a "stitched" SR policy that can be stitched or appended to the end of a local SR policy. The SR policy can be represented by a BSID, whereby the BSID may be dynamically updated as needed based on the status of a SR paths through a downstream domain. As such, a node in an upstream domain, which would not normally be knowledgeable of the status of the path in a downstream domain, can be updated in order to better select or create SR policies for only active or operational paths.

Again, the computing system 20 may be part of any Network Element (NE) or node in the distributed system 10. For example, the computing system 20 may be a border node (e.g., node D) from a downstream domain and communicating (advertising) this information to the other nodes in the local domain. In other embodiments, the computing system 20 may represent a part of another node (e.g., node A), which may be configured as a head-end node that is used as a source of the hierarchical SR policy. It may be noted that nodes A and D may include similar functionality for performing certain functions, while other functions may be performed by only one of nodes A and D. The other nodes in the distributed system 10 may be unaware of the functionality performed by nodes A and D (and/or other nodes destinated as border nodes, if necessary).

The memory device 24 or other suitable non-transitory computer-readable media may be configured to store the computer program (i.e., the SR stitching program 34). The SR stitching program 34 may include instructions that, when executed, enable the processing device 22 to obtain a Segment Routing (SR) policy for routing a packet along a path in a downstream domain. The SR policy may include at least a "source" field and a "color" field. The source field is configured to identify a border node that straddles the upstream domain and the downstream domain. The color field is configured to define the path in the downstream domain. Also, the instructions are configured to enable the processing device 22 to store the SR policy in the database 30. In some embodiments, the SR policy may further include a destination field for defining an end-point of the path in the downstream domain, whereby the end-point may represent a destination node or a service instance.

In some embodiments, the computing system 20 (e.g., NE) may represent a node that is not the border node (e.g., node A). In this respect, the instructions may further enable the processing device 22 to represent the SR policy using a BSID. The processing device 22 may be configured to advertise the SR policy and BSID to one or more other nodes in the upstream domain. For example, advertising the SR policy and BSID may include the use of the Interior Gateway Protocol (IGP). The BSID may include a value that is allocated by a Segment Routing Local Block (SRLB) associated with the upstream domain. Furthermore, the instructions may further enable the processing device 22 to create a hierarchical SR policy having the BSID appended to an end of the hierarchical SR policy, whereby the hierarchical SR policy may be configured for directing the packet to the border node before the border node routes the packet along the path in the downstream domain. Also, with respect to embodiments in which the computing system 20 does not represent the border node but represents, for example, node A, the instructions may further enable the processing device 22 to select the hierarchical SR policy from one or more dynamic SR policies stored in the database 30 for transmitting the packet along the path defined by the color field. The instructions may also enable the processing device 22 to create the hierarchical SR policy based on a limited depth of a segment list of the hierarchical SR policy. The hierarchical SR policy may be created for transmitting the packet from the NE to a destination node in the downstream domain without assistance from a higher level controller having knowledge of the NE and destination node.

According to other embodiments, the computing system 20 or NE may represent the border node (e.g., node D) itself. In this respect, the instructions may further enable the processing device 22 to obtain status information regarding the integrity or liveness of the path in the downstream domain. For example, the status information may be related to the presence or absence of faults in the path in the downstream domain and/or changes to the topology of the downstream domain. The instructions may further enable the processing device 22 to update the database with the status information. By signaling these other nodes, they may each be enabled to therefore store the status information in their own respective databases and create a hierarchical SR policy based on one or more available SR policies stored in the respective database for communicating with one or more nodes in the downstream domain.

The present disclosure is related to systems and methods for advertising BSIDs in SR policy mapping. Conventional BSIDs are normally provisioned manually in each node, such as by provisioning an LSP to signal the BSID according to existing BSID protocols. However, the embodiments of the present disclosure are configured to additionally signal the mapping of the SR policy the BSID is mapped to. BSIDs can be advertised so that other nodes in a local domain (or SR domain) know the status of the various segments related to the SR policies being used.

BSID may be on a locally significant entity (e.g., node D). Either manual configuring or automatic allocation may be used by node A or D, while all other nodes might not know about the aspects of the present disclosure.

BSID is an example of a policy (e.g., F D T). Node D knows how to translate or expand the BSID into another longer SID list (segment list) to be used in the next domain. T is the BSID translated at node D. Node A sends F D and the BSID to node D. In conventional system, the SR policy would include a static (or fixed) label at both nodes A and D, regardless of the condition of remote paths.

Node D stores information in its database so that it knows that BSID T is interpreted (expanded) to include the rest of the longer segment list. Node A knows that if it wants to use BSID T and sends the SR policy with the BSID T to node D. Nodes B, C, E, F, G may not be aware of the SR stitching processes being performed by nodes A and D. BSID may be provisioned manually at the head-end node (e.g., node A) and at the place (e.g., node D) where BSID T is to be replaced with the segment list. Preferably, the replacement component is a border component that can view the status of two different domains and can forward the packet to the downstream domain as instructed in the expanded segment list.

The BSID can be used as a hand-off between the domains. For example, if the head-end cannot enforce a large number of labels (e.g., six labels maximum), it can hand off the packet to another node (e.g., node D) with the BSID expanding capability (e.g., similar to a layer of recursion).

Part of the advertising or signaling functionality includes describing how BSID T is associated with the SR policy. The BSID may include the end (remote) portion of the SR policy and may specifically include the color and destination fields, as defined by the various embodiments in the present disclosure. For example, node D may signal that T is mapped to SR policy with color <10> and destination <node L>. When BSID T is provisioned, it is going to be advertised, which means that the local nodes do not need to manually provision the SR policies (either at nodes A or D or at any other local nodes that may wish to initiate an SR policy as a head-end). When the packet arrives at node D with BSID T, node D is configured to look up this BSID in its database, which may be configured to store multiple BSIDs for routing packets to any downstream nodes along any suitable paths.

The color can have any range of values that represents a label. Node A too can look into its database and find T instead of manually provisioning it. With the knowledge of the existence of node D (as the source of the remote portion) and that BSID T is configured to pass packets from node D to node L along a path defined by the "color" field, a network operator (using node A) can utilize the available SR policies regarding remote paths and stitch these remote BSIDs to the hierarchical SR policy to reach a certain destination (e.g., node L).

Signaling or advertising may be performed under IGP for communicating to nodes within the same local domain. If one of the BSIDs (e.g., BSID T) is active, it can be stitched in the SR policy and used as intended. However, when the remote topology of the distributed system 10 changes over time, a border node can detect the change and advertise this information to the upstream domain, even without the use of a higher level controller.

For example, the BSID may have local significance at node D. The locally significant node (e.g., node D) replaces the label with BSID T. It may be noted that there is no local significance at the head-end (e.g., node A) or other nodes of the first SR domain 12, but these other nodes can simply use BSID T as needed. Thus, the originator or head-end can stitch the BSID T to policy list to get the packet to node L via node D. Node D advertises the connection with node L to the nodes on the first SR domain 12.

If there are changes, only node D needs to be updated with new BSID T information to get packets to node L. With node D advertising (or flooding) information, node A (and other nodes) can store in their own respective databases (TE-DB) the SR policy with specific source, color, destination information. Again, node A in a conventional system might not know if the packet is arriving at node L and may keep using the SR policy. However, with the embodiments of the present disclosure, the SR stitching program 34 can make sure that the nodes on the first domain will know this informing by flooding.

Also, the "segment-type xx" is a new segment type that is not part of existing SR standard yet. It includes source, color, and destination (end point) for the SR policy. This may be regarded as a new provisioning model. With this system, node A can try to derive BSID from its database.

SR Stitching Processes

Figure 3:
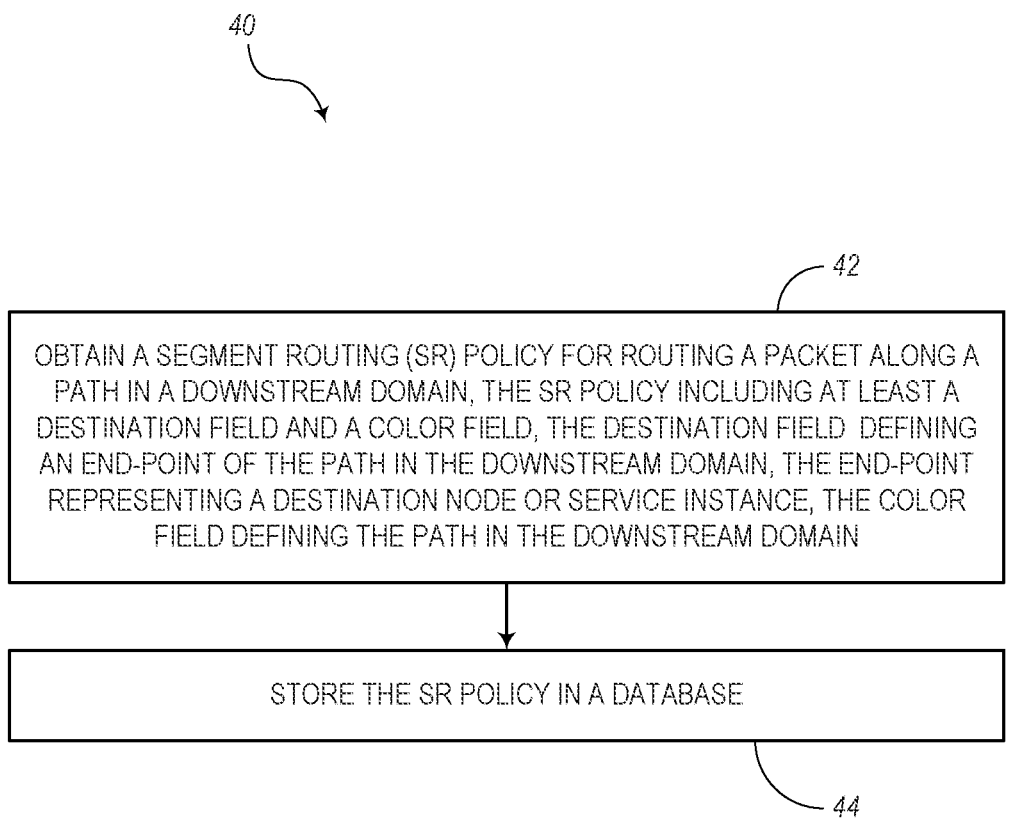
FIG. 3 is a flow diagram illustrating a general process for handling SR policies, according to various embodiments.

FIG. 3 is a flow diagram illustrating an embodiment of a process 40, described in general, for handling SR policies. In some embodiments, the process 40 may be performed by either a border node (e.g., node D) or a non-border node (e.g., a head-end node, such as node A) for routing packets through a network. A created "stitched" SR policy can be appended to the end of a local SR policy. The SR policy can be represented by a BSID, whereby the BSID may be dynamically updated as needed based on the status of SR paths throughout a downstream domain.

According to one implementation, the process 40 includes the step of obtaining a Segment Routing (SR) policy for routing a packet along a path in a downstream domain, as indicated in block 42. The SR policy, for example, may include at least a source field and a color field. The source field is configured to identify a border node that straddles the upstream domain and the downstream domain. The color field is configured to define the path in the downstream domain. Also, the process 40 includes the step of storing the SR policy in a database, as indicated in block 44.

In some embodiments, the SR policy may further include a destination field for defining an end-point of the path in the downstream domain, whereby the end-point may represent a destination node or a service instance. Also, the step of obtaining (block 42) may include receiving the SR policy from another node, from a network operator, or from another source. Furthermore, the action of obtaining may also include the step of actually creating the SR policy automatically.

Figure 4:
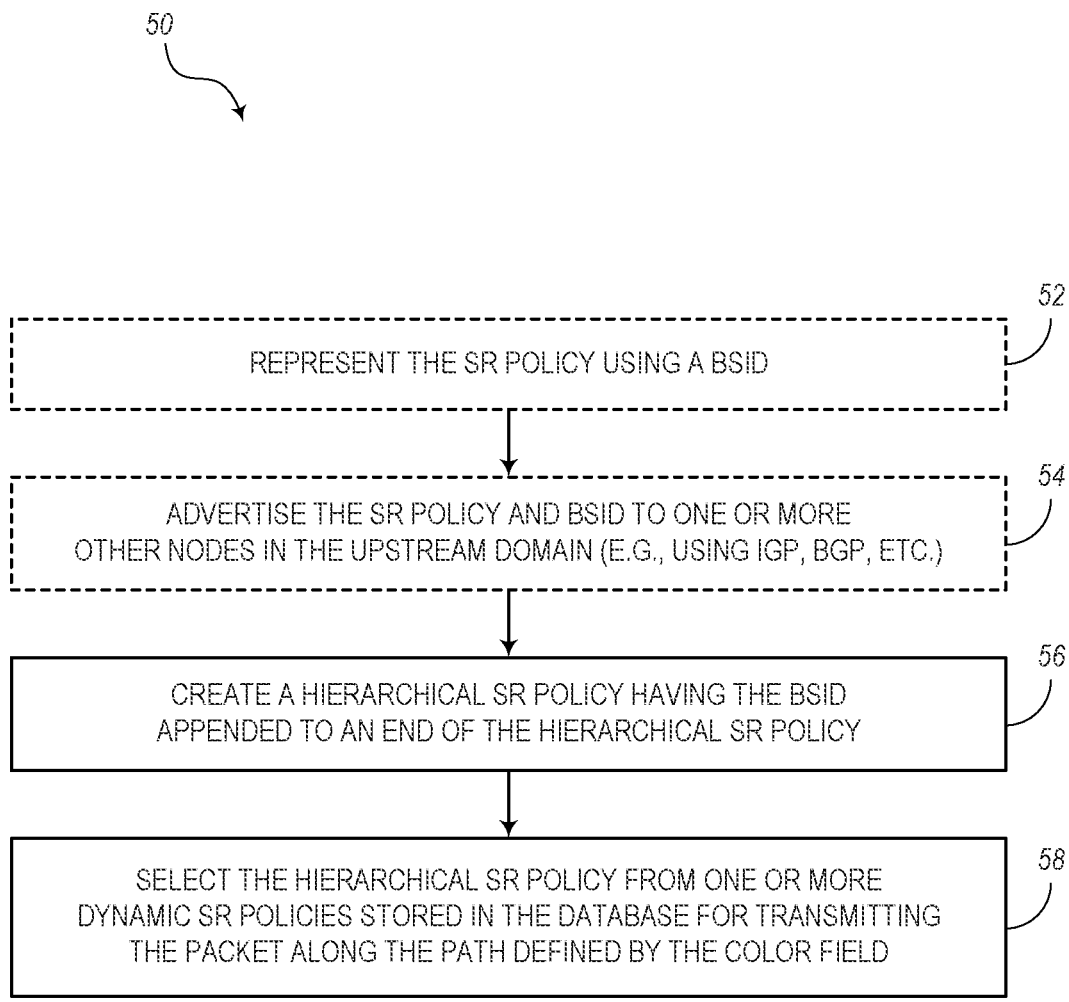
FIG. 4 is a flow diagram illustrating a process associated with a node that does not border a downstream domain, according to various embodiments.

FIG. 4 is a flow diagram illustrating an embodiment of a process 50 that may be associated with a node that need not border a downstream domain (e.g., node A and/or a network operator associated with node A). As illustrated, the process 50 includes the step of representing the SR policy using a BSID, as indicated in block 52. The process 50 also includes advertising the SR policy and BSID to one or more other nodes in the upstream domain, as indicated in block 54. For example, advertising the SR policy and BSID may include the use of the Interior Gateway Protocol (IGP) or Border Gateway Protocol (BGP). Also, the BSID may include a value that is allocated by a Segment Routing Local Block (SRLB) associated with the domain of the node. It may be noted that the steps indicated in blocks 52 and 54 may executed by either or both of nodes A and D, according to various embodiments.

Furthermore, the process 50 as illustrated in FIG. 4 includes the step of creating a hierarchical SR policy having the BSID appended to an end of the hierarchical SR policy, as indicated in block 56. For example, the hierarchical SR policy may be configured for directing the packet to the border node before the border node routes the packet along the path in the downstream domain. Also, the process 50 include the step of selecting the hierarchical SR policy from one or more dynamic SR policies stored in the database for transmitting the packet along the path defined by the color field, as indicated in block 58. Also, the step of creating the hierarchical SR policy (block 56) may be based on a limited depth of a segment list of the hierarchical SR policy. It may be noted that the hierarchical SR policy may be created for transmitting the packet from the NE (e.g., node A) to a destination node in the downstream domain without assistance from a higher level controller having knowledge of the NE and destination node.

Figure 5:
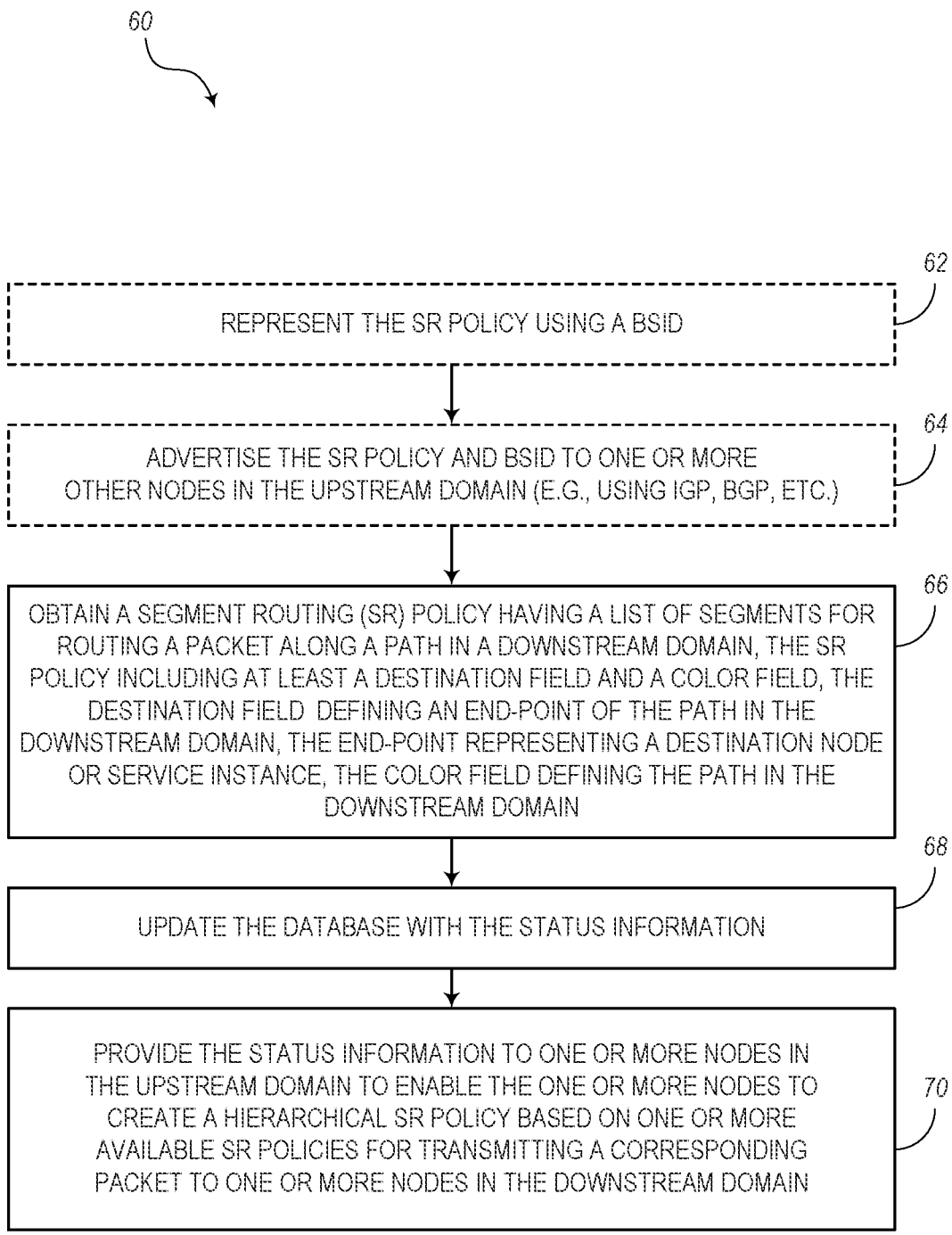
FIG. 5 is a flow diagram illustrating a process associated with a node that borders a downstream domain, according to various embodiments.

FIG. 5 is a flow diagram illustrating an embodiment of a process 60 that may be associated with a node that borders a downstream domain (e.g., node D). As shown, the process 60 may also include a step representing the SR policy using a BSID, as indicated in block 62. The process 60 also includes the step of advertising the SR policy and BSID to one or more other nodes in the upstream domain, as indicated in block 64. For example, advertising the SR policy and BSID may include the use of the IGP or BGP. The BSID may include a value that is allocated by a SRLB associated with the domain of the node. Again, it may be noted that the steps indicated in blocks 62 and 64 may executed by either or both of nodes A and D, according to various embodiments.

The process 60 further includes the step of obtaining status information regarding the integrity or liveness of the path in the downstream domain, as indicated in block 66. For example, the status information may be related to the presence or absence of faults in the path in the downstream domain and/or changes to the topology of the downstream domain. The process 60 may also include the steps of updating the database with the status information, as indicated in block 68, and providing the status information to one or more nodes in the upstream domain, as indicated in block 70. By providing these other nodes (e.g., including a head-end node, such as node A), they may each be enabled to therefore store the status information in a respective database and create a hierarchical SR policy based on one or more available SR policies stored in the respective database for communicating with one or more nodes in the downstream domain.

It may be noted that the systems and methods of the present disclosure are configured to provide various improvements over conventional SR protocols. For example, the present disclosure provides systems and methods that can advertise the SR policy and the BSID mapping in a local environment (e.g., a local SR domain), such as be using IGP or other suitable local domain communication protocols. Also, the SR policy and BSID mapping may include explicit path verification to check the liveness or integrity of the hierarchical SR policy. Furthermore, the present disclosure provides embodiments regarding the idea of updating the state of hierarchical SR policy at the head-end (e.g., even in the absence of a Path Computation Engine (PCE)), which may be based on the SR policy state. Another point of novelty is the concept of using the SR policy and the BSID mapping in SR policy traceroute to check the integrity of BSID in the hierarchical SR policy.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Network Element (NE) arranged in an upstream domain of a network, the NE comprising:
    a processing device,
    a database, and
    a memory device configured to store a computer program having instructions that, when executed, enable the processing device to
        obtain, via an advertisement, a Segment Routing (SR) policy including a Binding Segment Identifier (BSID) for routing a packet along a path in a downstream domain, the SR policy including at least a destination field and a color field, the destination field defining an end-point of the path in the downstream domain, the end-point representing a destination node or service instance, the color field defining the path in the downstream domain, and
        store the SR policy including the BSID in the database, wherein the SR policy is for the downstream domain, separate from the upstream domain with the NE, wherein status of the downstream domain is unknown to the NE in the upstream domain, and wherein the advertisement includes the SR policy and the BSID associated therewith, and wherein the NE is a device located in the upstream domain and the NE uses the SR policy for the downstream domain to stitch SR policies between the upstream domain and the downstream domain without assistance from a higher level controller having knowledge of the NE and the downstream domain, and without a Path Computation Engine (PCE) configured to compute paths spanning across multiple Interior Gateway Protocol (IGP) areas or level.

2. The NE of claim 1, wherein the SR policy further accompanies a source field identifying via the BSID a border node that straddles the upstream domain and the downstream domain.

3. The NE of claim 2, wherein the instructions further enable the processing device to create a hierarchical SR policy having the BSID appended to an end of the hierarchical SR policy, wherein the hierarchical SR policy is configured for directing the packet to the border node before the border node routes the packet along the path in the downstream domain.

4. The NE of claim 3, wherein the instructions further enable the processing device to select the hierarchical SR policy from one or more dynamic SR policies stored in the database for transmitting the packet along the path defined by the color field.

5. The NE of claim 3, wherein the instructions enable the processing device to create the hierarchical SR policy based on a limited depth of a segment list of the hierarchical SR policy.

6. The NE of claim 3, wherein the hierarchical SR policy is created for transmitting the packet from the NE to the end-point in the downstream domain without assistance from a higher level controller having knowledge of the NE and the end-point.

7. The NE of claim 1, wherein the instructions further enable the processing device to perform an explicit path verification in the downstream domain, including checking validity of the BSID in the downstream domain related to the SR policy.

8. The NE of claim 1, wherein the instructions further enable the processing device to use the SR Policy to forward packets/traffic to the end-point using the binding SID.

9. The NE of claim 1, wherein the SR policy and the BSID are obtained via one of the Interior Gateway Protocol (IGP) and the Border Gateway Protocol (BGP).

10. The NE of claim 1, wherein the BSID includes a value allocated by a Segment Routing Local Block (SRLB) associated with the downstream domain, the value is configured to identify and route traffic in the SR network.

11. The NE of claim 1, wherein the NE is a border node.

12. The NE of claim 11, wherein the instructions further enable the processing device to obtain status information regarding the integrity or liveness of the path in the downstream domain.

13. The NE of claim 12, wherein the status information is related to the presence or absence of faults in the path in the downstream domain and/or changes to the topology of the downstream domain.

14. The NE of claim 12, wherein the instructions further enable the processing device to update the database with the status information, and
    provide the status information to one or more nodes in the upstream domain to enable each of the one or more nodes to
    store the status information in a respective database, and
    create a hierarchical SR policy based on one or more available SR policies stored in the respective database for communicating with one or more nodes in the downstream domain.

15. A non-transitory computer-readable medium configured to store computer logic having instructions that, when executed, cause one or more processing devices in a Network Element (NE) to:
    obtain, via an advertisement, a Segment Routing (SR) policy including a Binding Segment Identifier (BSID) for routing a packet along a path in a downstream domain, the SR policy including at least a destination field and a color field, the destination field defining an end-point of the path in the downstream domain, the end-point representing a destination node or service instance, the color field defining the path in the downstream domain, and
    store the SR policy including the BSID in the database, wherein the SR policy is for the downstream domain, separate from the upstream domain with the NE, wherein status of the downstream domain is unknown to the NE in the upstream domain, and wherein the advertisement includes the SR policy and the BSID associated therewith, and wherein the NE is a device located in the upstream domain and the NE uses the SR policy for the downstream domain to stitch SR policies between the upstream domain and the downstream domain without assistance from a higher level controller having knowledge of the NE and the downstream domain, and without a Path Computation Engine (PCE) configured to compute paths spanning across multiple Interior Gateway Protocol (IGP) areas or level.

16. The non-transitory computer-readable medium of claim 15, wherein the SR policy further accompanies a source field identifying a border node that straddles the upstream domain and the downstream domain.

17. The non-transitory computer-readable medium of claim 16, wherein the instructions further cause the one or more processing devices to create a hierarchical SR policy having the BSID appended to an end of the hierarchical SR policy, wherein the hierarchical SR policy is configured for directing the packet to the border node before the border node routes the packet along the path in the downstream domain.

18. The non-transitory computer-readable medium of claim 15, wherein the instructions further cause the one or more processing devices to
represent the SR policy using the BSID, and
use the SR Policy to forward packets/traffic to the end-point using the binding SID.

19. A method comprising the steps of:
obtaining, via an advertisement, a Segment Routing (SR) policy including a Binding Segment Identifier (BSID) for routing a packet along a path in a downstream domain, the SR policy including at least a destination field and a color field, the destination field defining an end-point of the path in the downstream domain, the end-point representing a destination node or service instance, the color field defining the path in the downstream domain, and
storing the SR policy including the BSID in the database, wherein the SR policy is for the downstream domain, separate from the upstream domain with the NE, wherein status of the downstream domain is unknown to the NE in the upstream domain, and wherein the advertisement includes the SR policy and the BSID associated therewith, and wherein the NE is a device located in the upstream domain and the NE uses the SR policy for the downstream domain to stitch SR policies between the upstream domain and the downstream domain without assistance from a higher level controller having knowledge of the NE and the downstream domain, and without a Path Computation Engine (PCE) configured to compute paths spanning across multiple Interior Gateway Protocol (IGP) areas or level.

20. The method of claim 19, wherein the SR policy further accompanies a source field identifying a border node that straddles the upstream domain and the downstream domain and the BSID.

* * * * *